United States Patent
Goettl et al.

(10) Patent No.: US 12,392,152 B2
(45) Date of Patent: Aug. 19, 2025

(54) SWIMMING POOL PRESSURE AND FLOW CONTROL PUMPING AND WATER DISTRIBUTION SYSTEMS AND METHODS

(71) Applicant: Hayward Industries, Inc., Charlotte, NC (US)

(72) Inventors: Steven James Goettl, Phoenix, AZ (US); Dominic Conn, Tempe, AZ (US); John M. Goettl, Phoenix, AZ (US); Mark Walden, Gilbert, AZ (US)

(73) Assignee: Hayward Industries, Inc., Charlotte, NC (US)

( * ) Notice: Subject to any disclaimer, the term of this patent is extended or adjusted under 35 U.S.C. 154(b) by 160 days.

(21) Appl. No.: 17/642,606

(22) PCT Filed: Sep. 11, 2020

(86) PCT No.: PCT/US2020/050481
§ 371 (c)(1),
(2) Date: Mar. 11, 2022

(87) PCT Pub. No.: WO2021/050932
PCT Pub. Date: Mar. 18, 2021

(65) Prior Publication Data
US 2022/0341202 A1    Oct. 27, 2022

Related U.S. Application Data

(60) Provisional application No. 62/899,021, filed on Sep. 11, 2019.

(51) Int. Cl.
*E04H 4/12* (2006.01)
*G05D 7/06* (2006.01)

(52) U.S. Cl.
CPC ............. *E04H 4/12* (2013.01); *G05D 7/0688* (2013.01)

(58) Field of Classification Search
CPC ............................... E04H 4/12; G05D 7/0688
See application file for complete search history.

(56) References Cited

U.S. PATENT DOCUMENTS

| | | | |
|---|---|---|---|
| 3,157,597 | A | 11/1964 | Burba |
| 4,404,861 | A | 9/1983 | Wass |

(Continued)

FOREIGN PATENT DOCUMENTS

| | | |
|---|---|---|
| AU | 2006200701 A1 | 9/2006 |
| AU | 2012332382 A1 | 6/2014 |

(Continued)

OTHER PUBLICATIONS

Extended European Search Report dated Oct. 6, 2023, issued in connection with European Application No. 20863795.9 (9 pages).

(Continued)

*Primary Examiner* — Craig M Schneider
*Assistant Examiner* — Frederick D Soski
(74) *Attorney, Agent, or Firm* — McCarter & English, LLP

(57) ABSTRACT

Pumping and water distribution systems for pools/spas, and methods for control thereof are provided. A system includes a pump including a variable speed motor, a controller configured to control the speed of the motor, a plurality of pool/spa components, a plumbing subsystem placing the components in fluidic communication with the pump, and a plurality of control valves switchable between an open position and a closed position. Each of the control valves is associated with one of the components, positioned in the plumbing subsystem between the associated component and the pump to control the flow of fluid to the associated component, and is configured to provide a specific flow rate of fluid to the associated component based on a set system pressure when in the open position. The controller adjusts (Continued)

the speed of the motor to adjust the fluid pressure within the plumbing subsystem to match the set system pressure value.

25 Claims, 7 Drawing Sheets

(56) References Cited

U.S. PATENT DOCUMENTS

| | | | |
|---|---|---|---|
| 4,465,593 A | 8/1984 | Wemhoff | |
| 4,498,984 A * | 2/1985 | Colson | E04H 4/12 |
| | | | 4/508 |
| 4,606,819 A * | 8/1986 | Colson | E04H 4/12 |
| | | | 210/167.13 |
| 4,789,132 A | 12/1988 | Fujita et al. | |
| 4,834,133 A | 5/1989 | LaCoste et al. | |
| 4,838,483 A | 6/1989 | Nurczyk et al. | |
| 4,939,797 A * | 7/1990 | Goettl | E04H 4/169 |
| | | | 239/206 |
| 4,948,091 A | 8/1990 | Satoh et al. | |
| 5,287,567 A | 2/1994 | Eash et al. | |
| 5,422,014 A | 6/1995 | Allen et al. | |
| 5,566,717 A | 10/1996 | Robert | |
| 5,669,221 A | 9/1997 | LeBleu et al. | |
| 5,979,493 A | 11/1999 | Simpkins, Jr. | |
| 6,058,718 A | 5/2000 | Forsberg et al. | |
| 6,227,223 B1 | 5/2001 | Crochet et al. | |
| 6,228,272 B1 * | 5/2001 | Gola | E04H 4/12 |
| | | | 210/138 |
| 6,230,558 B1 | 5/2001 | Miwa et al. | |
| 6,279,177 B1 | 8/2001 | Gloodt | |
| 6,341,387 B1 * | 1/2002 | Zars | E04H 4/12 |
| | | | 4/504 |
| 6,487,919 B1 | 12/2002 | Edwards | |
| 6,516,249 B1 * | 2/2003 | Hoyle | G05D 7/0688 |
| | | | 700/282 |
| 6,557,777 B1 | 5/2003 | Pevnick | |
| 6,625,824 B1 * | 9/2003 | Lutz | E04H 4/12 |
| | | | 137/625.21 |
| 6,913,203 B2 | 7/2005 | DeLangis | |
| 7,083,392 B2 | 8/2006 | Meza et al. | |
| 7,373,787 B2 | 5/2008 | Forsberg et al. | |
| 7,681,436 B2 | 3/2010 | Biberger | |
| 7,686,589 B2 | 3/2010 | Stiles, Jr. et al. | |
| 7,815,396 B2 | 10/2010 | McFarland et al. | |
| 7,854,597 B2 | 12/2010 | Stiles, Jr. et al. | |
| 7,874,808 B2 | 1/2011 | Stiles | |
| 7,931,447 B2 * | 4/2011 | Levin | F04B 49/002 |
| | | | 700/282 |
| 7,942,071 B2 | 5/2011 | Claisse et al. | |
| 7,976,284 B2 | 7/2011 | Koehl | |
| 8,019,479 B2 | 9/2011 | Stiles et al. | |
| 8,281,647 B2 | 10/2012 | Boutet et al. | |
| 8,356,622 B2 | 1/2013 | Wears | |
| 8,444,394 B2 * | 5/2013 | Koehl | F04B 49/10 |
| | | | 361/28 |
| 8,459,100 B2 | 6/2013 | Biberger | |
| 8,465,262 B2 * | 6/2013 | Stiles, Jr. | F04B 49/20 |
| | | | 417/326 |
| 8,480,373 B2 | 7/2013 | Stiles, Jr. et al. | |
| 8,500,413 B2 | 8/2013 | Stiles, Jr. et al. | |
| 8,540,493 B2 | 9/2013 | Koehl | |
| 8,573,952 B2 * | 11/2013 | Stiles, Jr. | F04D 15/0066 |
| | | | 700/282 |
| 8,600,566 B1 | 12/2013 | Longo et al. | |
| 8,602,743 B2 * | 12/2013 | Stiles, Jr. | E04H 4/16 |
| | | | 318/434 |
| 8,602,745 B2 * | 12/2013 | Stiles, Jr. | F04D 15/0254 |
| | | | 417/44.11 |
| 8,606,413 B2 | 12/2013 | Picton | |
| 8,641,385 B2 | 2/2014 | Koehl | |
| 8,801,389 B2 | 8/2014 | Stiles, Jr. et al. | |
| 8,833,405 B2 | 9/2014 | Phallen et al. | |
| 8,840,376 B2 * | 9/2014 | Stiles, Jr. | F04B 49/065 |
| | | | 417/44.11 |
| 8,936,721 B2 * | 1/2015 | Renaud | C02F 1/004 |
| | | | 210/167.13 |
| 9,108,126 B2 * | 8/2015 | Renaud | B01D 24/10 |
| 9,222,274 B1 * | 12/2015 | Goettl | E04H 4/16 |
| 9,227,860 B1 * | 1/2016 | King | C02F 1/685 |
| 9,241,604 B2 | 1/2016 | Dries | |
| 9,243,413 B2 | 1/2016 | Robol et al. | |
| 9,366,046 B1 * | 6/2016 | Rodrick | F28D 1/0477 |
| 9,371,829 B2 | 6/2016 | Koehl | |
| 9,404,500 B2 | 8/2016 | Stiles, Jr. et al. | |
| 9,470,336 B2 | 10/2016 | Huffington et al. | |
| 9,501,072 B2 * | 11/2016 | Potucek | E04H 4/129 |
| 9,556,874 B2 | 1/2017 | Kidd et al. | |
| 9,568,005 B2 | 2/2017 | Robol et al. | |
| 9,581,478 B1 | 2/2017 | Smith | |
| 9,605,680 B2 | 3/2017 | Stiles, Jr. et al. | |
| 9,670,918 B2 | 6/2017 | Mueller | |
| 9,693,537 B2 | 7/2017 | Stiles, Jr. et al. | |
| 9,695,954 B2 | 7/2017 | Da Pont et al. | |
| 9,712,098 B2 * | 7/2017 | Kidd | H02H 7/0822 |
| 9,777,733 B2 | 10/2017 | Stiles, Jr. et al. | |
| 9,857,805 B2 | 1/2018 | Halimi | |
| 9,885,360 B2 * | 2/2018 | Boese | F04D 15/0066 |
| 9,932,984 B2 | 4/2018 | Stiles, Jr. et al. | |
| 9,938,741 B1 | 4/2018 | Goettl | |
| 10,253,515 B2 | 4/2019 | Rejniak et al. | |
| 10,261,523 B2 | 4/2019 | Khabbaz et al. | |
| 10,415,569 B2 * | 9/2019 | Stiles, Jr. | F04B 49/20 |
| 10,452,061 B2 | 10/2019 | Yenni et al. | |
| 10,465,676 B2 * | 11/2019 | Robol | F04B 19/00 |
| 10,487,813 B2 | 11/2019 | Mueller | |
| 10,508,423 B2 | 12/2019 | Herbert et al. | |
| 10,508,753 B2 | 12/2019 | Ravedati et al. | |
| 10,514,172 B2 | 12/2019 | Acker | |
| 10,538,979 B2 | 1/2020 | Jones et al. | |
| 10,590,926 B2 * | 3/2020 | Kidd | F04D 15/0236 |
| 10,663,959 B2 | 5/2020 | Yenni et al. | |
| 10,871,001 B2 * | 12/2020 | Stiles, Jr. | F04B 49/20 |
| 10,883,730 B2 | 1/2021 | Wang et al. | |
| 10,901,438 B2 | 1/2021 | Klein et al. | |
| 10,918,569 B2 | 2/2021 | Collins et al. | |
| 10,947,981 B2 * | 3/2021 | Stiles | F04D 15/0066 |
| 11,041,579 B2 | 6/2021 | Lopez et al. | |
| 11,061,392 B2 | 7/2021 | Yenni et al. | |
| 11,122,669 B2 | 9/2021 | Potucek et al. | |
| 11,137,780 B1 | 10/2021 | Doyle et al. | |
| 11,204,106 B2 | 12/2021 | Doyle et al. | |
| 11,208,822 B2 | 12/2021 | Doan et al. | |
| 11,215,175 B2 | 1/2022 | Doan et al. | |
| 11,221,637 B1 | 1/2022 | Doan et al. | |
| 11,307,600 B2 | 4/2022 | Doan et al. | |
| 11,573,580 B2 | 2/2023 | Doyle et al. | |
| 11,579,635 B2 | 2/2023 | Doyle et al. | |
| 11,579,636 B2 | 2/2023 | Doyle et al. | |
| 11,579,637 B2 | 2/2023 | Doyle et al. | |
| 11,698,647 B2 | 7/2023 | Doyle et al. | |
| 11,946,565 B2 | 4/2024 | Doyle et al. | |
| 2002/0029804 A1 | 3/2002 | Liorati et al. | |
| 2002/0069646 A1 | 6/2002 | Yeung | |
| 2003/0034284 A1 * | 2/2003 | Wolfe | A61H 33/6073 |
| | | | 210/90 |
| 2004/0215778 A1 | 10/2004 | Hesse et al. | |
| 2005/0081642 A1 | 4/2005 | Nehl et al. | |
| 2005/0119766 A1 | 6/2005 | Amundson et al. | |
| 2005/0167345 A1 * | 8/2005 | De Wet | C02F 1/008 |
| | | | 210/791 |
| 2005/0199275 A1 * | 9/2005 | Abbott | A61H 33/60 |
| | | | 134/169 C |
| 2005/0217260 A1 | 10/2005 | Desjardins et al. | |
| 2006/0168611 A1 | 7/2006 | Fima | |
| 2006/0283789 A1 | 12/2006 | Kadlec et al. | |
| 2007/0034644 A1 | 2/2007 | Bertucci et al. | |
| 2007/0114162 A1 | 5/2007 | Stiles et al. | |
| 2008/0087330 A1 | 4/2008 | Burlage et al. | |
| 2008/0148471 A1 | 6/2008 | Tatum | |
| 2008/0168599 A1 | 7/2008 | Caudill et al. | |
| 2009/0078038 A1 | 3/2009 | Ushigusa et al. | |

(56) References Cited

U.S. PATENT DOCUMENTS

| | | | |
|---|---|---|---|
| 2009/0151801 A1 | 6/2009 | Gorman et al. | |
| 2009/0204263 A1 | 8/2009 | Love | |
| 2010/0018911 A1 | 1/2010 | VanZeeland | |
| 2010/0032492 A1 | 2/2010 | Grimm et al. | |
| 2010/0071800 A1 | 3/2010 | Kohler et al. | |
| 2010/0096338 A1* | 4/2010 | De Wet | E04H 4/12 210/103 |
| 2010/0200475 A1 | 8/2010 | Kwon | |
| 2010/0237608 A1 | 9/2010 | Mosher | |
| 2010/0300213 A1 | 12/2010 | Fink et al. | |
| 2010/0300548 A1 | 12/2010 | DeVerse | |
| 2011/0083748 A1 | 4/2011 | Ellis et al. | |
| 2011/0108490 A1* | 5/2011 | Fischmann Torres | C02F 9/00 210/241 |
| 2011/0130976 A1 | 6/2011 | Lamberti et al. | |
| 2011/0197977 A1 | 8/2011 | Henderson | |
| 2011/0231024 A1 | 9/2011 | Medizade | |
| 2011/0265883 A1 | 11/2011 | Cruse et al. | |
| 2011/0286859 A1 | 11/2011 | Ortiz et al. | |
| 2012/0017367 A1 | 1/2012 | Reeder et al. | |
| 2012/0037248 A1* | 2/2012 | Hof | E04H 4/12 137/552 |
| 2012/0073040 A1* | 3/2012 | Cohen | E04H 4/12 4/504 |
| 2012/0115060 A1 | 5/2012 | Stier et al. | |
| 2012/0192583 A1 | 8/2012 | Lifson et al. | |
| 2012/0205302 A1* | 8/2012 | Palmer | E04H 4/12 248/346.03 |
| 2013/0319535 A1 | 12/2013 | Boger et al. | |
| 2014/0130487 A1 | 5/2014 | Akiyama et al. | |
| 2014/0130878 A1 | 5/2014 | Marinez | |
| 2014/0165719 A1 | 6/2014 | Williamson et al. | |
| 2014/0183957 A1 | 7/2014 | Duchesneau | |
| 2014/0230925 A1 | 8/2014 | Halimi | |
| 2014/0262997 A1* | 9/2014 | Renaud | E04H 4/1654 210/167.2 |
| 2014/0262998 A1 | 9/2014 | Wagner et al. | |
| 2014/0277772 A1 | 9/2014 | Lopez et al. | |
| 2014/0303757 A1 | 10/2014 | Pruchniewski et al. | |
| 2014/0303782 A1* | 10/2014 | Pruchniewski | G05B 15/02 709/204 |
| 2014/0314062 A1 | 10/2014 | Loebs | |
| 2015/0027557 A1 | 1/2015 | Crawford | |
| 2015/0030463 A1 | 1/2015 | Stiles, Jr. et al. | |
| 2015/0153744 A1 | 6/2015 | Didion et al. | |
| 2015/0159503 A1 | 6/2015 | Leininger et al. | |
| 2015/0292985 A1 | 10/2015 | Yenni et al. | |
| 2015/0315803 A1 | 11/2015 | Hamza et al. | |
| 2015/0319941 A1 | 11/2015 | Klein et al. | |
| 2016/0077530 A1 | 3/2016 | Moran et al. | |
| 2016/0077531 A1 | 3/2016 | Kucera et al. | |
| 2016/0122210 A1* | 5/2016 | Cosac Albu | C02F 1/4672 210/759 |
| 2016/0199744 A1* | 7/2016 | McCarthy | E04H 4/12 472/128 |
| 2016/0238668 A1 | 8/2016 | Cordray et al. | |
| 2016/0290524 A1 | 10/2016 | Ferraz | |
| 2016/0299096 A1* | 10/2016 | Greenwood | C02F 1/66 |
| 2016/0348981 A1* | 12/2016 | Rodrick | E04H 4/14 |
| 2017/0027410 A1 | 2/2017 | Stoyanov et al. | |
| 2017/0053360 A1 | 2/2017 | Loeb et al. | |
| 2017/0070842 A1 | 3/2017 | Kulp et al. | |
| 2017/0190602 A1 | 7/2017 | Porat et al. | |
| 2017/0211711 A1 | 7/2017 | Ritter et al. | |
| 2017/0215261 A1* | 7/2017 | Potucek | H05B 47/105 |
| 2018/0039236 A1 | 2/2018 | Acosta Gonzalez | |
| 2018/0087938 A1 | 3/2018 | Neilson et al. | |
| 2018/0113481 A1 | 4/2018 | Faiczak | |
| 2018/0143052 A1 | 5/2018 | Xie et al. | |
| 2018/0148912 A1 | 5/2018 | Park | |
| 2018/0174207 A1* | 6/2018 | Potucek | G06Q 50/08 |
| 2018/0224822 A1* | 8/2018 | Potucek | G05B 19/042 |
| 2018/0359969 A1 | 12/2018 | Millar | |
| 2018/0364654 A1 | 12/2018 | Locke et al. | |
| 2019/0024943 A1 | 1/2019 | Scott et al. | |
| 2019/0277119 A1 | 9/2019 | Campion | |
| 2019/0286172 A1 | 9/2019 | O'Dell et al. | |
| 2019/0314243 A1 | 10/2019 | MacCallum et al. | |
| 2019/0320626 A1 | 10/2019 | Wang et al. | |
| 2019/0331252 A1* | 10/2019 | Jensen | G05D 9/12 |
| 2019/0368620 A1 | 12/2019 | Masen et al. | |
| 2020/0070796 A1 | 3/2020 | Braatz et al. | |
| 2020/0122185 A1 | 4/2020 | Carriere et al. | |
| 2020/0123952 A1 | 4/2020 | DeHart et al. | |
| 2020/0182236 A1 | 6/2020 | Beisel et al. | |
| 2020/0201365 A1 | 6/2020 | Shimizu et al. | |
| 2020/0319621 A1 | 10/2020 | Roy et al. | |
| 2021/0011500 A1 | 1/2021 | Halimi et al. | |
| 2021/0039129 A1 | 2/2021 | Bolan et al. | |
| 2021/0283724 A1 | 9/2021 | Dessart et al. | |
| 2021/0298557 A1 | 9/2021 | Budampati et al. | |
| 2021/0300804 A1 | 9/2021 | Broga et al. | |
| 2021/0301985 A1 | 9/2021 | Brown et al. | |
| 2021/0309539 A1 | 10/2021 | Budampati et al. | |
| 2021/0324649 A1 | 10/2021 | Revilla et al. | |
| 2022/0003071 A1 | 1/2022 | Ahmari | |
| 2022/0042504 A1 | 2/2022 | Ward et al. | |
| 2022/0113749 A1 | 4/2022 | Doan et al. | |
| 2022/0125677 A1 | 4/2022 | Doan et al. | |
| 2022/0269292 A1 | 8/2022 | Doyle et al. | |
| 2022/0269293 A1 | 8/2022 | Doyle et al. | |
| 2022/0341203 A1 | 10/2022 | Doyle et al. | |
| 2022/0341204 A1 | 10/2022 | Doyle et al. | |
| 2022/0342430 A1 | 10/2022 | Doyle et al. | |
| 2024/0061450 A1 | 2/2024 | Doyle et al. | |

FOREIGN PATENT DOCUMENTS

| | | |
|---|---|---|
| CA | 2614643 C | 11/2009 |
| CN | 204225208 U | 3/2015 |
| CN | 104879534 A | 9/2015 |
| CN | 106641422 A | 5/2017 |
| DE | 102014006511 A1 | 11/2015 |
| DE | 202016004416 U1 | 8/2017 |
| DE | 102014208261 B4 | 8/2020 |
| EP | 2306257 A1 | 4/2011 |
| FR | 2538834 A1 | 7/1984 |
| JP | H07158295 A | 6/1995 |
| WO | 2004/070242 A1 | 8/2004 |
| WO | 2020/120973 A2 | 6/2020 |
| WO | 2020/120974 A2 | 6/2020 |
| WO | 2020/120975 A2 | 6/2020 |
| WO | 2020/120977 A2 | 6/2020 |
| WO | 2020/160658 A1 | 8/2020 |
| WO | 2021/050932 A1 | 3/2021 |
| WO | 2021/091773 A1 | 5/2021 |
| WO | 2022/226361 A1 | 10/2022 |

OTHER PUBLICATIONS

International Search Report and Written Opinion of the International Searching Authority dated Jan. 29, 2021, issued in connection with International Application No. PCT/US2020/050481 (10 pages).

Jimmy C. K. Tong, et al., Attainment of Flowrate Uniformity in the Channels That Link a Distribution Manifold to a Collection Manifold, Mar. 28, 2007, Fluids Engineering Division of ASME, vol. 129 (Year: 2007) (7 pages).

Mathieu Martin, et al., Direct Simulation Based Model-Predictive Control of Flow Maldistribution in Parallel Microchannels, Oct. 8, 2009, Journal of Fluids Engineering by ASME, vol. 131 (Year: 2009) (17 pages).

* cited by examiner

SWIMMING POOL PRESSURE AND FLOW CONTROL PUMPING AND WATER DISTRIBUTION SYSTEMS AND METHODS

CROSS-REFERENCE TO RELATED APPLICATIONS

The present application is a U.S. National Phase Application under 35 U.S.C. § 371 of International Application No. PCT/US2020/050481 filed on Sep. 11, 2020, which claims the benefit of priority to U.S. Provisional Patent Application Ser. No. 62/899,021, filed on Sep. 11, 2019, the entire disclosures of which are hereby incorporated by reference.

TECHNICAL FIELD

The present disclosure relates generally to systems and methods for pressure and flow control in pool and spa equipment. More specifically, the present disclosure relates to swimming pool pressure and flow control pumping and water distribution systems and methods.

RELATED ART

Typically, in the pool and spa field, current applications of variable speed pumps within the swimming pool environment do not supply predictable and precise water flow to all combinations of pool/spa equipment. Generally, in prior art systems, the desired flow to various pool/spa system components (e.g., pool/spa equipment) is established during initial system set-up by assigning a given pump RPM (revolutions per minute) operating parameter based on published pump performance curve estimates in order to achieve a given flow. However, determining flow settings for multiple components in a single system can sometimes be unpredictable, which can result in improper flow being provided to the components and cause poor performance and efficiency of the pool/spa pumping and distribution system. The result is a pool/spa system that does not properly operate and utilizes excessive energy. Further, the operational configuration of current variable speed pump technology does not always achieve the intended variable speed benefit, as such pumps might not always operate at the lowest possible motor speed or conserve pump motor horsepower energy. In some instances, an operator may set a variable speed pump to an RPM value and a flow value that is below the specified flow requirement of a single component or grouping of components hoping to save energy. However, the actual result is that the associated components might underperform or not perform at all, which can result in excessive run times, system inefficiency, and increased power usage. Additionally, in some scenarios, total GPM (gallons per minute) required by the components might exceed the maximum capacity of the pump, e.g., when multiple system component's demands exceed pump capacity. In such situations, the total GPM flow is reduced to all components, which can further reduce performance and proper system operation, and waste pump motor energy.

Moreover, pool system components typically require specific flow for optimal performance and efficiency. However, current "non-smart" variable speed pumping technology can sometimes operate independent of system component requirements, and instead vary the flow based on a programmed setting or component control interlock. In such systems, exact flow to each component is often unknown and unpredictable based on system variables. This can result in pool components performing based on a separately programmed pump speed and associated valve, which might allow for flows higher or lower than component requirements.

Accordingly, what is desired is a system that provides proper and specified flow to maximize pool/spa component efficiency and performance, maximizes variable speed pump energy efficiency, and considers individual system component specified requirements in determining required flow of a variable speed pump. As such, it is desirable to provide pool and spa owners with swimming pool/spa pressure and flow control pumping and water distribution systems and methods, which solve these and other needs.

SUMMARY

The present disclosure relates to swimming pool pressure and flow control pumping and water distribution systems and methods. Specifically, the present disclosure relates to pumping and water distribution systems for movement of water in a swimming pool or spa that can provide a specific and predictable water flow to various swimming pool components in multiple and varied configurations of independent and simultaneous operation. Embodiments of the invention can include a variable speed pump controlled by dynamic or calibrated speed control to achieve specific flows at a given system pressure. Additional embodiments can include an adjustable and modifiable fluid circuit/component control valve that is automatically or manually adjustable to operate at a specific pressure and flow, and operates as an on/off control valve. The system can allow the system pump to provide the minimum flow possible to provide exact and specified flow to each swimming pool component being supplied by the pump, while operating the system pump at the lowest speed (e.g., RPM value) necessary to provide the required specified flow to maximize energy efficiency. Each swimming pool component, when activated, can receive a precise specified flow to maximize performance and efficiency.

Furthermore, the system of the present disclosure can provide precise specified water flow to pool system components while continuously seeking the lowest possible pump motor speed. Pump speed can be based on water flow requirements of the system components in lieu of a time clock or other programming mechanism governing the pump speed with no direct feedback or interlock to component flow performance. As such, the system of the present disclosure can exploit the benefit of variable speed pumping to adjust motor speeds incrementally and in real-time based on system needs to provide a precise system flow, while minimizing energy consumption of the pump. Further, the control system can provide automatic calibration and set-up of the component control valves and system parameters. Still further, in accordance with some embodiments of the present disclosure, the control system can prioritize the pool system components, determine if a current total flow requirement for a plurality of activated pool system components exceeds a flow capacity of the pump, and deactivate the component having the lowest priority value if the current total flow requirement exceeds the flow capacity of the pump.

In accordance with embodiments of the present disclosure, a pumping and water distribution system for a pool or spa includes a pump including a variable speed motor, a controller configured to control the speed of the variable speed motor, a plurality of pool/spa components, a plumbing subsystem placing the plurality of pool/spa components in fluidic communication with the pump, and a plurality of control valves each switchable between an open position and a closed position. The controller can store a set system pressure value that can be used for adjusting the speed of the variable speed motor. Each of the plurality of control valves can be associated with one of the plurality of pool/spa components and can be positioned in the plumbing subsystem between the associated pool/spa component and the pump in order to control the flow of fluid to the associated pool/spa component. Each of the plurality of control valves can be configured to provide a specific flow rate of fluid to the associated pool/spa component based on a set system pressure when in the open position. The controller can adjust the speed of the variable speed motor in order to adjust a pressure of fluid within the plumbing subsystem to match the set system pressure value.

In accordance with other embodiments of the present disclosure, a method for controlling a pool or spa pumping system is provided. Information can be received at a controller and can include a set system pressure value and a required flow rate of each of a plurality of pool/spa components. A plurality of control valves each switchable between an open position and a closed position can be provided. Each of the plurality of control valves can be associated with one of the plurality of pool/spa components based on the information in order to provide a specific flow rate of fluid to the associated pool/spa component based on the set system pressure when the control valve is in the open position. Each of the plurality of control valves can be positioned in a plumbing subsystem between the associated pool/spa component and a pump in order to control the flow of fluid to the associated pool/spa component. The speed of a variable speed motor of the pump can be adjusted in order to adjust a pressure of fluid within the plumbing subsystem to match the set system pressure value.

BRIEF DESCRIPTION OF THE DRAWINGS

The foregoing features of the invention will be apparent from the following Detailed Description, taken in connection with the accompanying drawings, in which.

DETAILED DESCRIPTION

The present disclosure relates to swimming pool pressure and flow control pumping and water distribution systems and methods, as described in detail below in connection with FIGS. 1-7.

Figure 1:
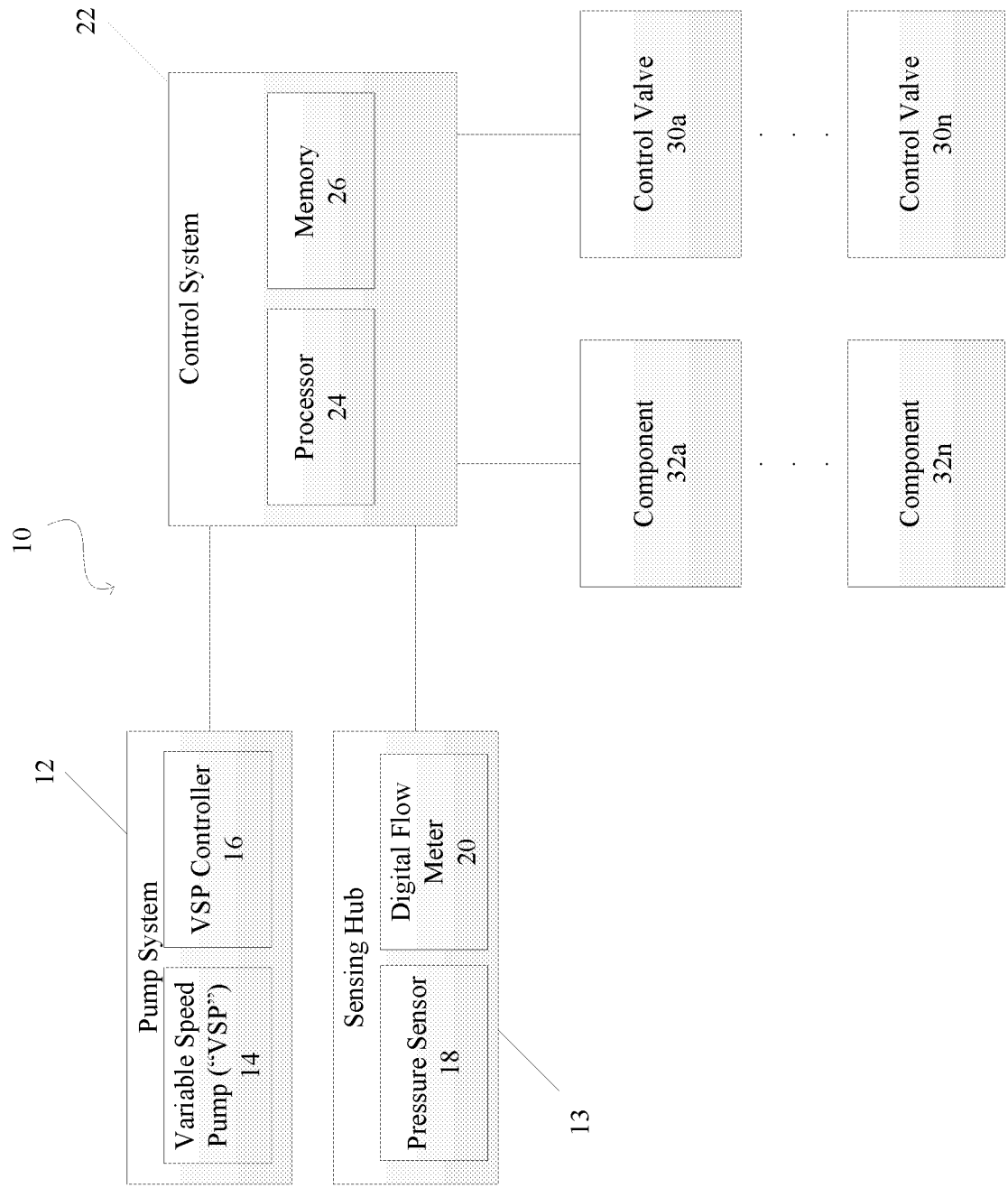
FIG. 1 is a diagram illustrating a pool/spa system of the present disclosure.

FIG. 1 is a diagram illustrating a pool/spa system of the present disclosure, indicated generally at system 10. The system 10 includes a pump system 12, a sensing hub 13, a control system 22, control valves 30a-30n, and components 32a-32n. The pump system 12 includes a variable speed pump ("VSP") 14 and a variable speed pump controller 16, and can be electrically connected to the control system 22. The sensing hub 13 includes a pressure sensor 18, and a flow meter 20, such as a digital flow meter, an analog flow meter, etc., and can be electrically connected to the control system 22. The pressure sensor 18 and the flow meter 20 can be positioned in a water return pipe, such that the pressure sensor 18 can provide system pressure data and the flow meter 20 can provide flow data to the control system 22. It is noted that the pump controller 16, the pressure sensor 18, and the digital flow meter 20 can be affixed to, installed within, or located remotely from the variable speed pump 14, and can be digitally or wirelessly connected to the variable speed pump 14. It is additionally noted that, while the pressure sensor 18 and the flow meter 20 are shown as being included in the pump system 12, these components can be separate therefrom and/or connected directly to the control system 22.

The variable speed pump 14 provides water from a pool/spa to the components 32a-32n, e.g., via piping or a plumbing subsystem that includes one or more pipes. The components 32a-32n can include $H_2O$ features, pool/spa jets, an in-floor cleaning system, water features, a heater, a filter, a chlorinator, a chemical feeder, a sterilizer (e.g., an ultraviolet sterilizer, an ozone sterilizer, or a combination ultraviolet and ozone sterilizer), a pool cleaner, etc. The flow of water to each component 32a-32n is controlled via a corresponding control valve 30a-30n using a pressure/flow control and on/off motorized functions. Each component 32a-32n can be designated as an essential component or a non-essential component. As will be explained in greater detail below, the control system 22 can prioritize essential components over non-essential components when available water pressure is limited, e.g., during operation or prior to activating an additional component.

The control system 22 can include a processor 24 in communication with a memory 26 including at least one of a random-access memory and a non-volatile memory. For example, the control system 22 can be an OmniLogic® or OmniHub® controller manufactured and sold by Hayward Industries, Inc. The processor 24 provides local processing capability for the control system 22. The memory 26 can store one or more local control programs for providing automated system setup, balance and calibration setup, and control of pool and spa equipment (e.g., the pump system 12, the control valves 30a-30n, the components 32a-32n, etc.). The processor 24 is in communication with the pump system 12, the control valves 30a-30n, and the components 32a-32n, e.g., via a digital or a wireless signal. It is also noted that in some embodiments the control valves 30a-30n and the components 32a-32n can instead be in electrical communication with, and controlled by, the variable speed pump controller 16 instead of the control system 22. In other embodiments, one or more of the components 32a-32n may not be controlled by the control system 22, but instead may be controlled by a separate, e.g., remote, controller or no controller at all. For example, some components 32a-32n may be solely fluid controlled such that they operate based on whether pressurized fluid is provided thereto. Such components may therefore be controlled by whether the associated control valve 30a-30n is open or closed, and are not electrically controlled, e.g., by a controller. The control valves 30a-30n can be activated manual or by automated control from the control system 22 via the processor 24. In some embodiments, the control valves 30a-30n can be manual valves that are not connected with the control system 22, but instead are manually actuated by a user or a technician. The processor 24 can detect changes in the water pressure and/or in the water flow at a position downstream the outlet of the variable speed pump 14 using the pressure sensor 18 and/or the flow meter 20. For example, the outlet of the variable speed pump 14 can be connected to a main fluid return line of a pool/spa plumbing system, which is in fluidic communication with the control valves 30a-30n and the components 32a-32n via one or more pipes. In such a configuration, the pressure sensor 18 can be positioned within the main fluid return line to detect system pressure. It should also be understood that additional components may be controlled by the control system 22 independently or in response to a particular control valve 30a-30n or component 32a-32n being activated. For example, if the component 32a is a heater, then the control system 22 can open an associated gas valve or relay required for proper operation of the heater in addition to the associated control valve 30a.

The system 10 can further include a display, such as a touchscreen, a screen with a touchpad, etc. The display can be affixed to, installed within, or installed remotely from the pump system 12 or the control system 22. The display can receive user input via, for example, the touch screen, a keyboard, a remote or wireless input device, etc. The display can further show diagnostic issues, messages, instructions, etc.

The system 10 is configured to provide precise flow to each component 32a-32n at a set system pressure while maintaining the minimum necessary pump speed and energy usage to provide the required flow to each of the components 32a-32n. This is achieved by adjusting the speed of the motor of the variable speed pump 14 in real-time to the value necessary to provide the required flow to each of the components 32a-32n based on which control valves 30a-30n are open or closed, which is discussed in greater detail below.

As discussed above, each of the components 32a-32n is in fluidic communication with the variable speed pump 14, such that the variable speed pump 14 provides pressurized water thereto for operation. Accordingly, all of the components 32a-32n are connected with the same piping system as the variable speed pump 14. The components 32a-32n can operate at a standard pre-determined system pressure, which can be established by determining the component 32a-32n in the system that has the highest pressure loss during operation. For example, if the highest pressure loss component utilized within a pool is an in-floor cleaning system that has a total pressure loss of 21 PSI at a specified flow rate of 68 GPM, then the control system 22 can establish 21 PSI as the system pressure set point to be utilized.

The control system 22 can perform an initial set-up process that allows for establishing the system pressure and calibrates the control valves 30a-30n. Specifically, the control system 22, in dynamic or set-up operation, can calibrate the flow provided to each component 32a-32n at the set system pressure by adjusting each associated control valve 30a-30n. The control valves 30a-30n can be single valves that control pressure and flow, as well as on/off functionality, or can be two separate valves where one valve provides a desired flow at a given pressure and a second valve is an on/off valve. Further, the control valves 30a-30n can be non-adjustable set valves that provide a certain flow at a certain pressure and would, therefore, be specific to the component that they are associated with, or the valves can be electrically or manually adjustable valves, e.g., via a disc insert, adjustable screw setting, etc. Accordingly, the control valves 30a-30n can include an adjustable pressure setting to provide the required resistance for each of the components 32a-32n to be equalized to the system pressure utilizing the following criteria: (Component/line loss pressure)+(valve pressure setting at the specified flow)=system pressure; where system pressure is equal to the highest component pressure loss, as discussed above. When the control valve 30a-30n is calibrated, it can allow a specified flow at a given pressure. Additionally, not only can the control valves 30a-30n be calibrated based on the flow required by the associated component 32a-32n for proper performance, they can also be calibrated based on a discretionary flow value to adjust performance of the associated component 32a-32n based on a user's desire. For example, a water feature might be operable within a range of flow values such that a lower flow value results in one operation and a higher flow value results in a second operation, e.g., the water feature might discharge water different distances depending on how much flow is provided thereto. Accordingly, during set-up, the control valves 30a-30n can be calibrated based on a desired operation or performance of the associated component 32a-32n.

Accordingly, the control valve 30a-30n, when in the open position, will provide the specified component flow at the specified system pressure to the associated component 32a-32n for which it has been calibrated. Once initial set-up has been performed, as discussed above, the control valves 30a-30n will operate as an on/off valve in normal operational use. During operation, as control valves 30a-30n are opened and closed, the variable speed pump 14 will increase or decrease motor speed (e.g., motor RPM) to meet the required system pressure set point. Thus, the system pressure set point is maintained by increasing and decreasing the pump speed of the variable speed pump 14 in response to the opening and closing of control valves 30a-30n. The processor 24 determines whether the variable speed pump 14 is providing the set system pressure based on the pressure sensor 18. When the specified system pressure is maintained via motor speed settings of the variable speed pump 14, utilizing system pressure dynamic or static set points, the system 10 achieves precise flow to the components 32a-32n while maintaining the lowest possible motor speed. Thus, during normal operation, the variable speed pump 14 will operate at the lowest RPM value necessary to provide the specified system pressure.

Additionally, in a situation where the cumulative flow requirement of the components 32a-32n currently operating exceeds total pump flow capacity, the control system 22 can deprioritize non-essential components and delay or pause operation thereof. When an essential (e.g., high priority) component's run cycle is complete, the non-essential (e.g., lower priority) component's operation can begin/resume. Additionally, the control system 22 can determine the current cumulative flow requirements of the components 32a-32n currently operating, and can prevent additional control valves 30a-30n and components 32a-32n from being activated if activation of such control valve 30a-30n and component 32a-32n would result in the cumulative flow requirement exceeding the total pump flow capacity. Alternatively, in such a configuration, the control system 22 could allow the new control valve 30a-30n and component 32a-32n to be activated, but in turn deactivate a different control valve 30a-30n and component 32a-32n that has a lesser priority in order to allow the higher priority components 32-32n to operate but not allow the cumulative flow requirement to exceed the total pump flow capacity.

Figure 2:
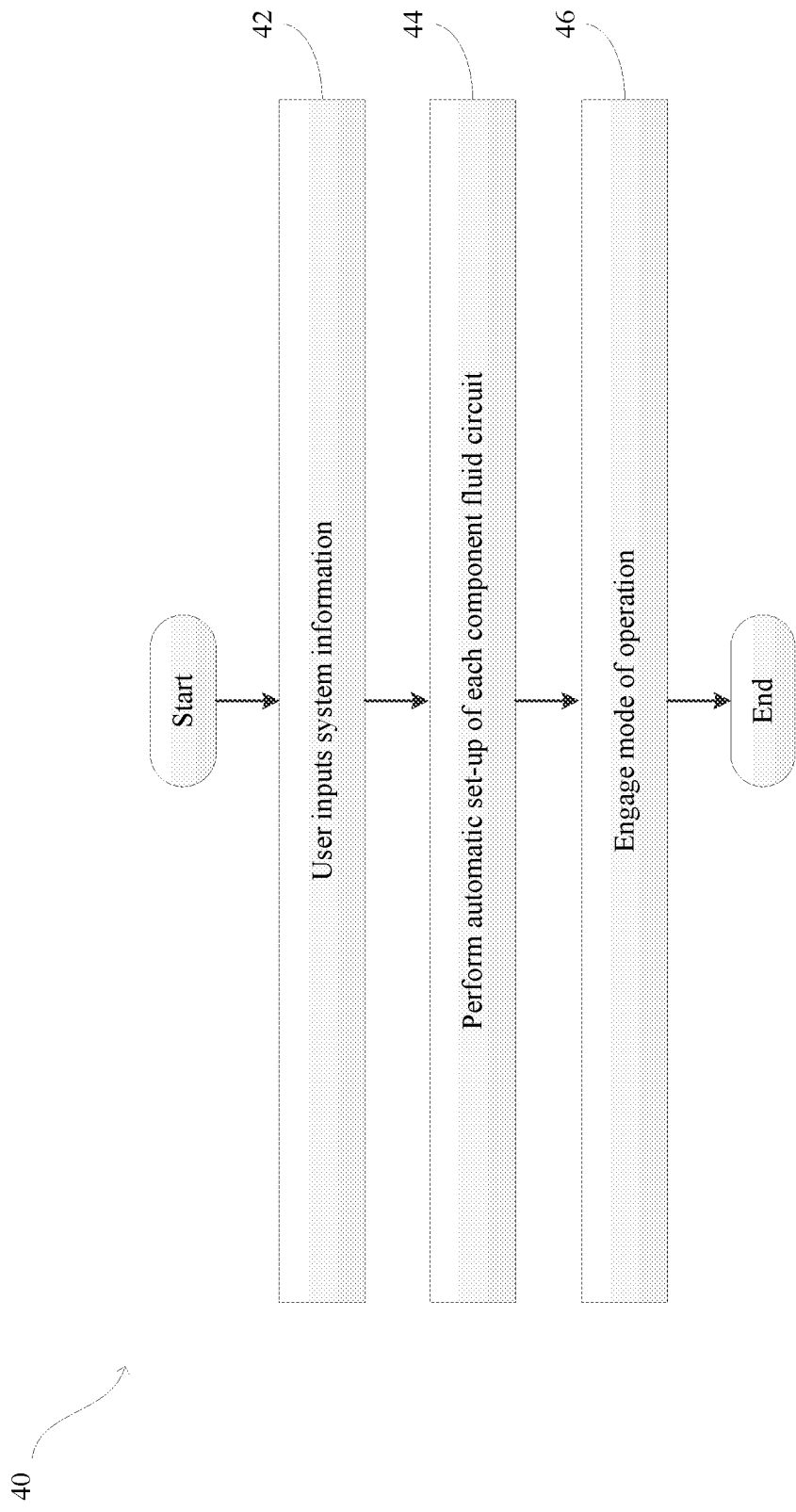
FIG. 2 is a flowchart illustrating process steps carried out by the pool/spa system of the present disclosure during a set-up and calibration mode.

FIG. 2 is a flowchart illustrating process steps carried out by the system 10 of the present disclosure during a set-up and calibration mode, indicated generally at method 40. In step 42, a user inputs system information into the control system 22. For example, the user can enter into the control system 22 the required flow rate of each component 32a-32n, and a system pressure value, as prompted by the display of the control system 22 through an automatic set-up feature. As discussed above, the set system pressure value can be the pressure loss of the component 32a-32n having the highest pressure loss during operation.

In step 44, the control system 22 performs an automatic set-up of each component 32a-32n fluid circuit to provide the exact flow at the set system pressure. For example, utilizing inputs to and from the pressure sensor 18, the flow meter 20, the variable speed pump 14, and/or the control valves 30a-30n, the control system 22 can automatically calibrate each of the control valves 30a-30n so that they provide the necessary flow for operation of the associated component 32a-32n at the set system pressure. Alternatively, the control valves 30a-30n can be manually set by a field technician based on prompts from the control system 22. The following considerations can be taken into account when calibrating the valves 30a-30n: 1) the component 32a-32n with the highest loss will not require a flow control device, but instead only requires an on/off control valve due to the system pressure setting being equal to the highest loss component and no additional pressure being introduced to that component; and 2) all remaining control valves will be equalized to the system pressure setting or the highest loss component utilizing the following formula: (Component pressure loss)+(added adjusted loss via the flow control valve at the required component GPM)=established system pressure. Finally, in step 46, the system 10 engages a mode of operation. The mode of operation can include a dynamic pressure control mode of operation, a programmed RPM set point control mode of operation, an automatic system component underflow management mode of operation, a regular mode of operation, or other modes of operation. The modes of operation will be discussed in further detail below.

Figure 3:
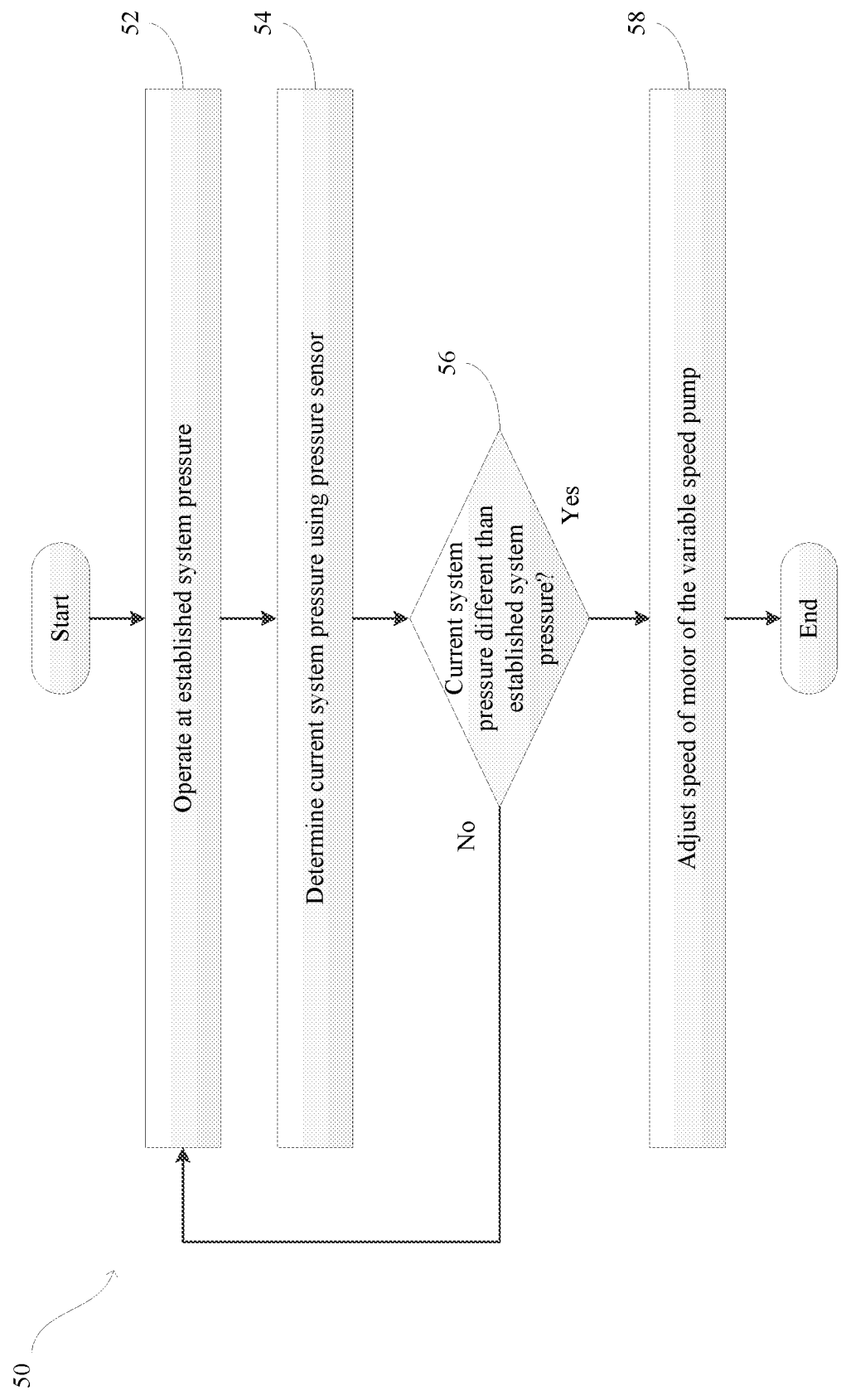
FIG. 3 is a flowchart illustrating process steps carried out by the pool/spa system of the present disclosure for performing a dynamic pressure control mode of operation.

FIG. 3 is a flowchart illustrating process steps carried out by the system 10 of the present disclosure to perform the dynamic pressure control mode of operation, indicated generally at method 50. In step 52, the system 10 operates at the set system pressure. For example, the variable speed pump 14 can operate at a certain speed to achieve the set system pressure. In step 54, the system 10 determines a current system pressure using the pressure sensor 18. In step 56, the system determines whether the current system pressure is different from the set system pressure (e.g., whether the current system pressure is greater or less than the set system pressure). If it is determined that there is no pressure difference, or the pressure difference does not exceed a predetermined threshold, then the system 10 returns back to step 52 and continues to monitor the system pressure. If the system 10 determines there is a pressure difference, then the system 10 proceeds to step 58, where the system 10 adjusts the speed (e.g., increases the RPMs or decreases the RPMs) of the motor of the variable speed pump 14. Specifically, the system 10 adjusts the speed of the motor to increase or decrease the system pressure to equal that of the established system pressure valve.

As discussed above, the system pressure will increase or decrease depending on which of the control valves 30a-30n are opened or closed based on, for example, a timed schedule or user inputs via the control system 22. For example, when a control valve 30a-30n is closed, a system pressure higher than the system pressure set point forms. Using the dynamic pressure control mode of operation described in connection with method 50, the system 10, via the pressure sensor 18, will sense the change in pressure and the variable speed pump 14 will increase or decrease its motor speed to meet and maintain the system pressure set point. As such, by maintaining the system pressure and calibrating the control valves 30a-30n to the set system pressure, a predictable and reliable flow will be achieved at each component 32a-32n when its control valve 30a-30n is in the open position, thus providing the most efficient operation and proper system and component 32a-32n performance. With component flow optimized, the components 32a-32n will perform required functions in reduced time periods and allow significant reductions of variable speed pump 14 usage durations and variable speed pump 14 motor power consumption.

Figure 4:
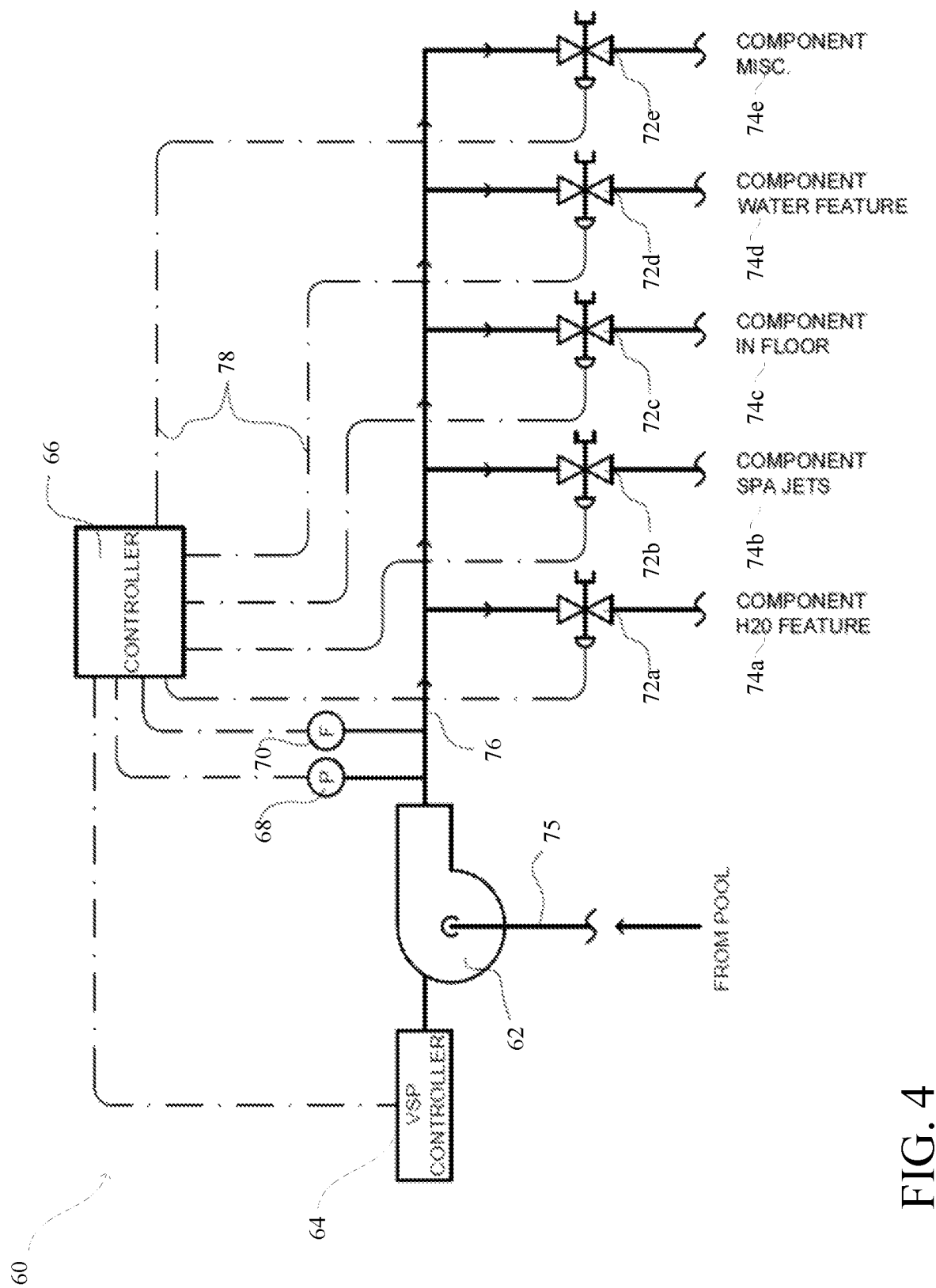
FIG. 4 is a schematic diagram showing a first embodiment of a pool/spa system of the present disclosure in the dynamic pressure control mode of operation.

FIG. 4 is a schematic diagram showing a first embodiment of a system 60 in the dynamic pressure control mode of operation. As shown in FIG. 4 the system 60 includes a variable speed pump 62, a pump controller 64, a control system 66, a pressure sensor 68, a flow meter 70, a plurality of control valves 72a-72e, and a plurality of components 74a-74e. A pool suction main pipe 75 is connected to an inlet of the variable speed pump 62, and a pool return main pipe 76 is connected to an outlet of the variable speed pump 62, such that water is drawn from a pool through the pool suction main pipe 75 into the variable speed pump 62, and discharged from the variable speed pump 62 through the pool return main pipe 76 to the control valves 72a-72e, which control the flow of water to the components 74a-74e. The pool return main pipe 76 can be a part of a plumbing subsystem that places the components 74a-74e in fluidic communication with the variable speed pump 62, and the control valves 72a-72e can be placed in the plumbing subsystem between the components 74a-74e and the variable speed pump 62. The plumbing subsystem can also include branched piping extending from the pool return main pipe 76 to the components 74a-74e. The control system 66 is connected to the control valves 72a-72c via regular voltage wiring, and to the control valves 72d-72e through low voltage wiring 78. The components 74a-74e can include H$_2$O features 74a, pool/spa jets 74b, an in-floor cleaning system 74c, water features 74d, and other components 74e, such as a heater, a filter, a chlorinator, etc.

The control system 66 can perform an initial set-up process that allows for establishing the system pressure and calibrates the control valves 72a-72n, in similar fashion to that discussed in connection with FIGS. 1-3. Specifically, the control system 66 can first establish a system pressure by determining the component 74a-74n in the system 60 that has the highest pressure loss during operation and setting the system pressure to that value, and then calibrate each control valve 72a-72n to provide the proper flow to each component 74a-74n at the set system pressure, as discussed above in FIG. 1. The system 60 can then provide precise flow to each component 74a-74n at the set system pressure by adjusting the speed of the motor of the variable speed pump 62 to the value necessary to maintain the system pressure at the set system pressure value and thus provide the required flow to each of the components 74a-74n based on which control valves 72a-72n are open or closed. That is, as control valves 72a-72n are opened or closed, the control system 66 will instruct the variable speed pump 62 to either increase speed (RPMs) or decrease speed (RPMs) in order to adjust the current system pressure so as to match the set system pressure value established during set-up. This is achieved by receiving pressure readings from the pressure sensor 68, comparing the readings to the set system pressure value established during set-up, and adjusting the speed of the variable speed pump 62 until the current pressure reading of the pressure sensor 68 matches the set system pressure value.

Figure 5:
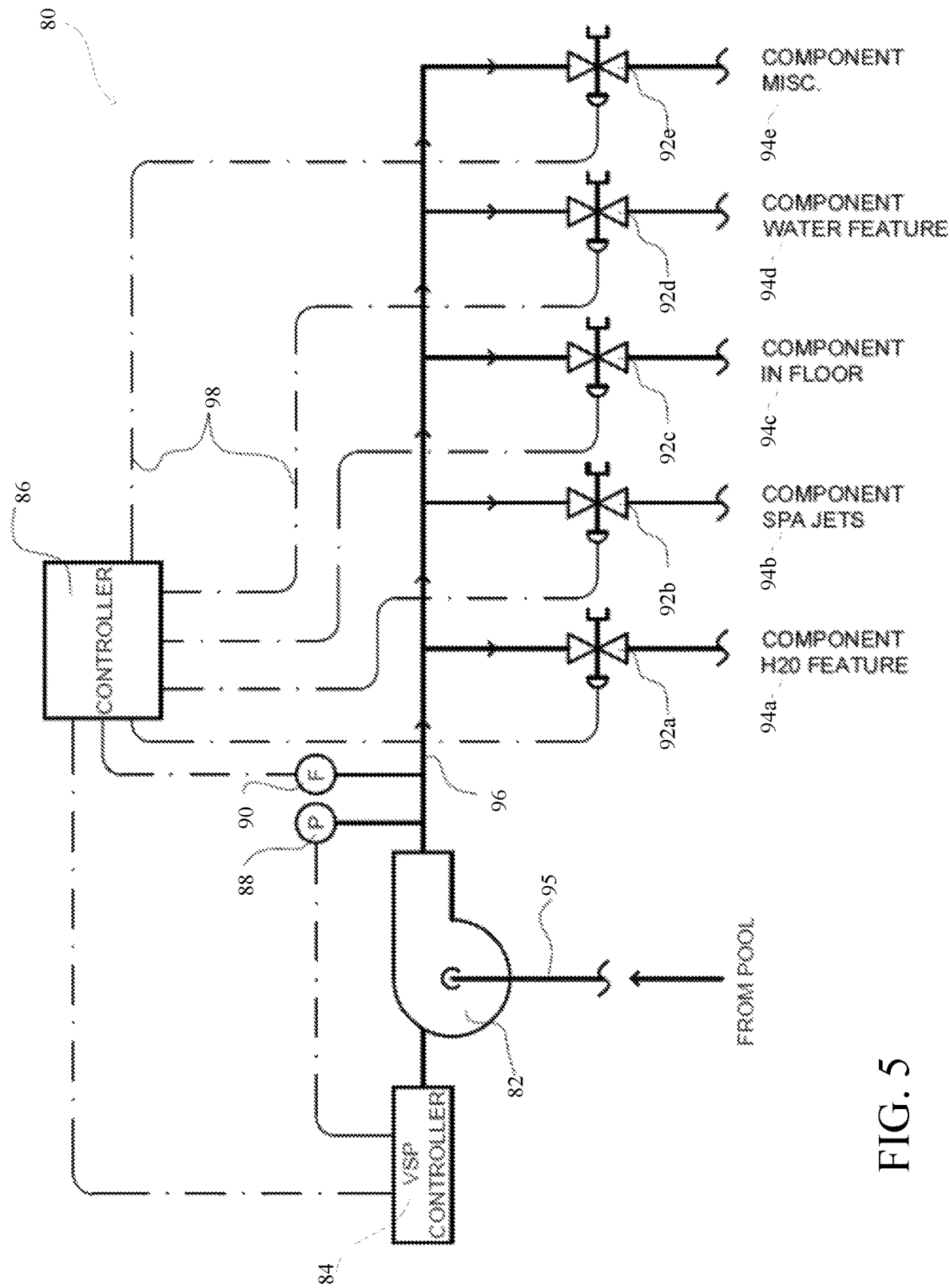
FIG. 5 is a schematic diagram showing a second embodiment of a pool/spa system of the present disclosure in a programmed RPM set point control mode of operation.

FIG. 5 is a schematic diagram showing a second embodiment of system 80 in the programmed RPM set point control mode of operation. As shown in FIG. 5, the system 80 includes a variable speed pump 82, a pump controller 84, a control system 86, a pressure sensor 88, a flow meter 90, a plurality of control valves 92*a*-92*e*, and a plurality of components 94*a*-94*e*. A pool suction main pipe 95 is connected to an inlet of the variable speed pump 82, and a pool return main pipe 96 is connected to an outlet of the variable speed pump 82, such that water is drawn from a pool through the pool suction main pipe 95 into the variable speed pump 82, and discharged from the variable speed pump 82 through the pool return main pipe 96 to the control valves 92*a*-92*e*, which control the flow of water to the components 94*a*-94*e*. The pool return main pipe 96 can be a part of a plumbing subsystem that places the components 94*a*-94*e* in fluidic communication with the variable speed pump 82, and the control valves 92*a*-92*e* can be placed in the plumbing subsystem between the components 94*a*-94*e* and the variable speed pump 82. The plumbing subsystem can also include branched piping extending from the pool return main pipe 96 to the components 94*a*-94*e*. The control system 86 is connected to the control valves 92*a*-92*c* via regular voltage wiring, and to the control valves 92*d*-92*e* through low voltage wiring 98. The components 94*a*-94*e* can include $H_2O$ features 94*a*, pool/spa jets 94*b*, an in-floor cleaning system 94*c*, water features 94*d*, and other components 94*e*, such as a heater, a filter, a chlorinator, etc.

In the programmed RPM set point control mode of operation, the system 80 can utilize the pressure sensor 88, the flow meter 90, the controller 86, and control valves 92*a*-92*n* for system set-up and calibration, e.g., in similar fashion to that discussed in connection with FIG. 1. As each the of the component circuits are calibrated, e.g., the control valves 92*a*-92*n* are calibrated for the desired flow needed by the associated component 94*a*-94*n*, the controller 86 records the motor speed (RPM) value required to provide the specified flow and pressure to each component 94*a*-94*n*. Additionally, once the controller 86 has determined the required motor speed (RPM) value for operation of each component 94*a*-94*n*, it can automatically test all configurations of component groupings to determine the motor speed (RPM) value required to provide the specified flow to each component 94*a*-94*n* for each of the various component configurations. This determination can be based on the required motor speed (RPM) value for each component individually 94*a*-94*n* that was previously determined by the controller 86. For example, a first grouping can include the filter, the pool/spa jets, and the in-floor cleaning system, and a second grouping can include the filter, pool/spa jets, and the chlorinator. Once the calibration and set-up of the system component configurations are determined, the system records the required pump RPM set points for each component grouping for future use.

Under normal operation, the controller 86 assigns pump RPM values to each component 94*a*-94*n* and multiple component groupings. In this configuration, the system 80 can operate based on only pump RPM values with predictable and accurate performance. As such, the system 80 would not need to determine pressure measurements or flow measurements because the pump RPM values are predetermined for each grouping of components, and can thus operate as a sensorless/"dumb" system. The system 10 can further perform automatic recalibration of the RPM values at preset intervals determined by a user utilizing the pressure sensor.

Figure 6:
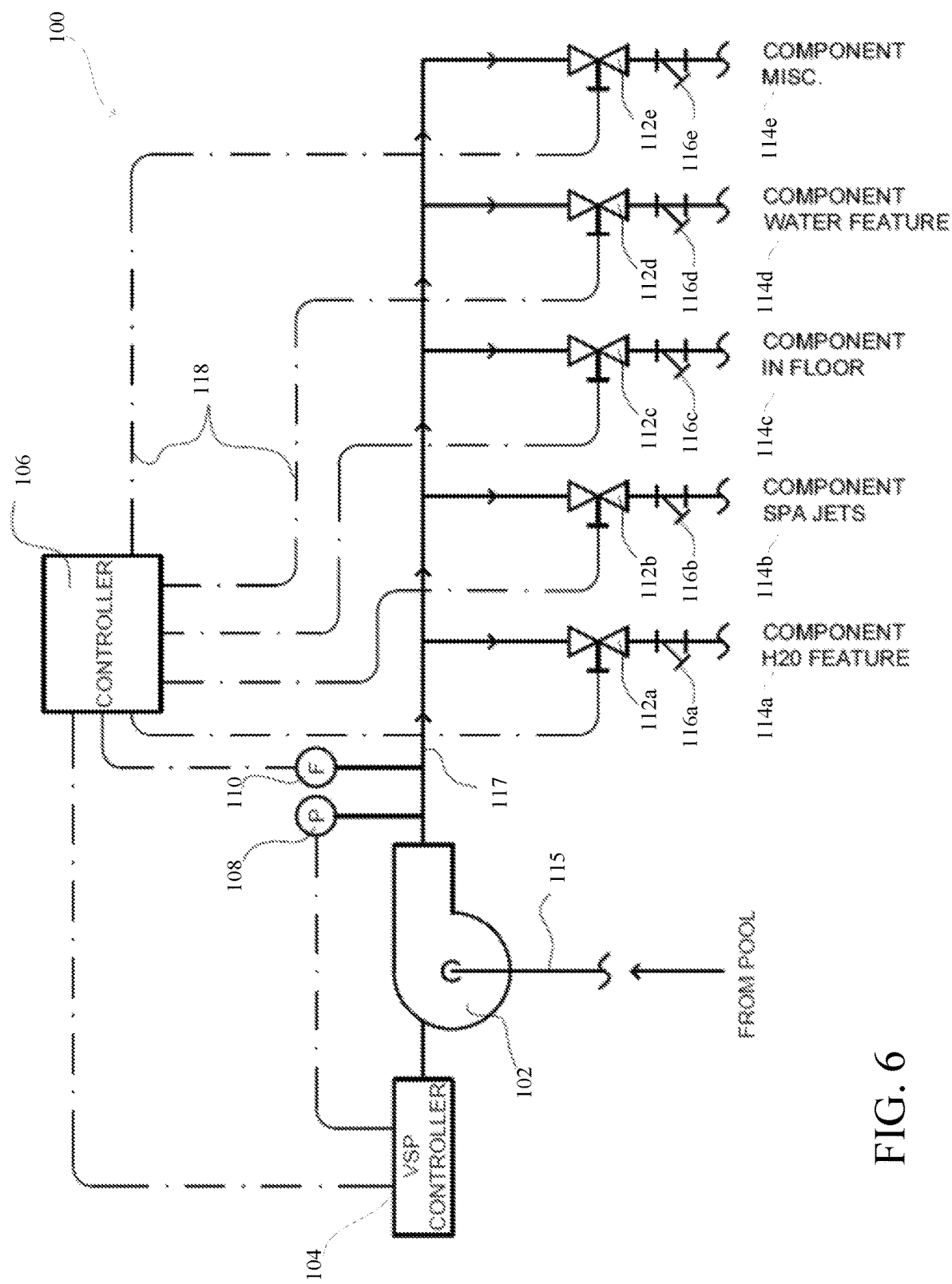
FIG. 6 is a schematic diagram showing a third embodiment of a pool/spa system of the present disclosure including manual component pressure set-up with automatic ON/OFF component and pump control.

FIG. 6 is a schematic diagram showing a third embodiment of a system 100 including a manual component pressure set-up with automatic ON/OFF component and pump control. As shown in FIG. 6, the system 100 includes a variable speed pump 102, a pump controller 104, a controller/control system 106, a pressure sensor 108, a flow meter 110, a plurality of control valves 112*a*-112*e*, a plurality of components 114*a*-114*e*, and a plurality of manual volume/pressure control devices 116*a*-116*e* (e.g., adjustable valves). A pool suction main pipe 115 is connected to an inlet of the variable speed pump 102 and a pool return main pipe 117 is connected to an outlet of the variable speed pump 102, such that water is drawn from a pool through the pool suction main pipe 115 into the variable speed pump 102, and out through the pool return main pipe 117 to the control valves 112*a*-112*e*, which control the flow of water to the manual volume/pressure control devices 116*a*-116*e* which in turn control the flow of water to the components 114*a*-114*e*. The pool return main pipe 117 can be a part of a plumbing subsystem that places the components 114*a*-114*e* in fluidic communication with the variable speed pump 102, and the control valves 112*a*-112*e* and the manual volume/pressure control devices 116*a*-116*e* can be placed in the plumbing subsystem between the components 114*a*-114*e* and the variable speed pump 102. The plumbing subsystem can also include branched piping extending from the pool return main pipe 117 to the components 114*a*-114*e*. The control system 106 is connected to the control valves 112*a*-112*c* via regular voltage wiring, and to the control valves 112*d*-112*e* through low voltage wiring 118. The components 114*a*-114*e* can include $H_2O$ features 114*a*, pool/spa jets 114*b*, an in-floor cleaning system 114*c*, water features 114*d*, and other components 114*e*, such as a heater, a filter, a chlorinator, etc.

The control system 106 can use the pressure sensor 108, the flow meter 110, the control valves 112*a*-112*e*, and the manual volume/pressure control devices 116*a*-116*e* for set-up and calibration. Specifically, control valve pressure set points can be manually adjusted by a user (e.g., a set-up technician, a repairman, a pool owner, etc.) utilizing the manual volume/pressure control devices 116*a*-116*e*. The manual volume/pressure control devices 116*a*-116*e* can be adjustable valves that can be adjusted by a technician to provide the desired flow at the set system pressure for the associated component 114*a*-114*e*. For example, the technician can adjust the adjustable valve based on prompts from the control system 106 until the desired settings are attained. Once set, the manual volume/pressure control devices 116*a*-116*e* are not adjusted by the system controller 106, but during normal operation, the system controller 106 will operate the control valves 112*a*-112*e*, which can be on/off valves, to direct water flow to the associated component 114*a*-114*e*.

Furthermore, the system 100 can operate in the programmed RPM set point control mode of operation discussed above in connection with FIG. 5. In this mode, the control system 106 records required pump RPM set points to provide specified flow and pressure to each component 114*a*-114*e*. Additionally, the control system 106 can test all configurations of component groupings to determine the RPM value necessary to provide the flow required for each component configuration. Once the system 100 calibrates the manual volume/pressure control devices 116a-116e and sets the system component configurations, the required pump RPM set points for each component and configuration are recorded by the control system 106. As such, the system 100 can be operated based on only pump RPM values with predictable and accurate performance. This eliminates the need for the pressure sensor 108 to be used during everyday operation. Additionally, the valves and RPM values can be manually recalibrated based on user determined intervals to ensure that the components 114a-114e are being provided with the correct flow and are operating optimally.

Figure 7:
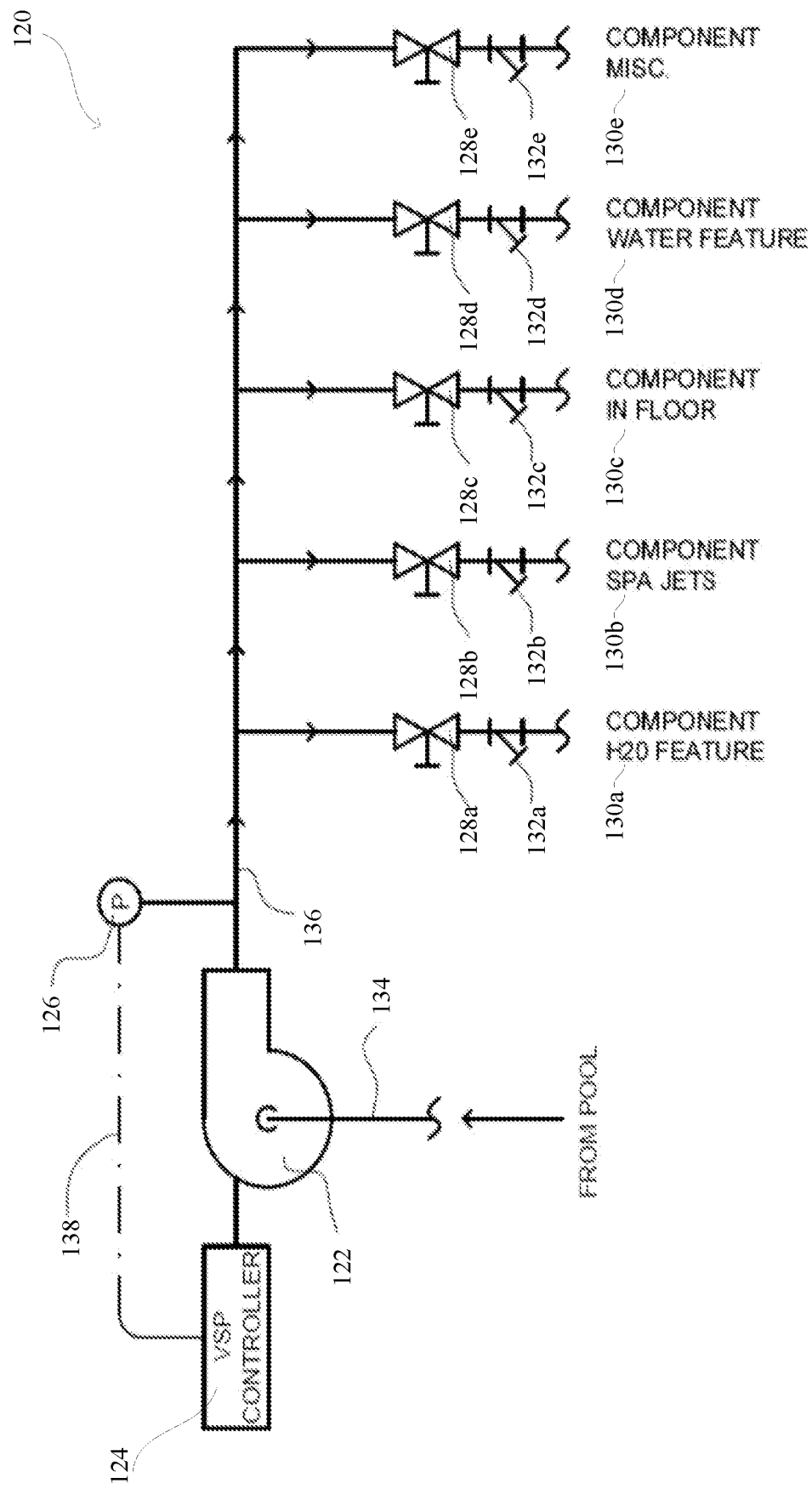
FIG. 7 is a schematic diagram showing a fourth embodiment of a pool/spa system including manual component pressure set-up with manual ON/OFF component control and automatic pump control.

FIG. 7 is a schematic diagram showing a fourth embodiment of a pool/spa system 120 including manual component pressure set-up with manual ON/OFF component control and automatic pump control. As shown in FIG. 7, the system 120 includes a variable speed pump 122, a pump controller 124, a pressure sensor 126, control valves 128a-128e, components 130a-130e, manual volume/pressure control devices 132a-132e, and low voltage wiring 138. The pump controller 124 can use the pressure sensor 126, the control valves 128a-128e, the components 130a-130e, and the manual volume/pressure control devices 132a-132e (e.g., adjustable valves), along with external system set-up instrumentation, to set-up and calibrate the system 120. A pool suction main pipe 134 is connected to an inlet of the variable speed pump 122 and a pool return main pipe 136 is connected to an outlet of the variable speed pump 122, such that water is drawn from a pool through the pool suction main pipe 134 into the variable speed pump 122, and out through the pool return main pipe 136 to the control valves 128a-128e, which control the flow of water to the manual volume/pressure control devices 132a-132e which in turn control the flow of water to the components 130a-130e. The pool return main pipe 136 can be a part of a plumbing subsystem that places the components 130a-130e in fluidic communication with the variable speed pump 122, and the control valves 128a-128e and the manual volume/pressure control devices 132a-132e can be placed in the plumbing subsystem between the components 130a-130e and the variable speed pump 122. The plumbing subsystem can also include branched piping extending from the pool return main pipe 136 to the components 130a-130e. The components 130a-130e can include H₂O features 130a, pool/spa jets 130b, an in-floor cleaning system 130c, water features 130d, and other components 130e, such as a heater, a filter, a chlorinator, etc.

The manual volume/pressure control devices 132a-132e can be adjustable valves that can be set-up and calibrated by a technician to provide the desired flow at the set system pressure for the associated component 130a-130e. For example, the technician can adjust the manual volume/pressure control devices 132a-132e based on prompts from a remote calibration and set-up instrument until the desired settings are attained. Once the calibration and set-up of the manual volume/pressure control devices 132a-132e is finished, and the system pressure is set, the required system pressure set points are input into the pump controller 124. This allows for manual recalibration based on user determined intervals. Further, once set, the user can manually operate the control valves 128a-128e, which can be on/off valves, to allow water to flow to the associated manual volume/pressure control devices 132a-132e and thus to the associated component 130a-130e.

In this configuration, the user manually turns on and off the control valves 128a-128e to turn on or off the associated components 130a-130e. In response to the opening and closing of valves 128a-128e, the variable speed pump 122 will speed up or slow down to achieve the pre-set desired system pressure as read by the pressure sensor 126. The system 120 will perform substantially more efficient than normal non-calibrated, manually controlled pool systems because it utilizes precise pressure and flow settings on component circuits, allowing the variable speed pump 122 to operate at the lowest possible speed necessary to provide the specified and calibrated flow. Accordingly, the components 130a-130e will operate at peak efficiency, and the minimum pump speeds and motor horsepower will be utilized to perform required pool operations.

The systems 10, 60, 80, 100, 120 can also include an automatic system component underflow management mode of operation, which takes into account component priority. Specifically, when the cumulative/total flow required for all components 32a-32n, 74a-74e, 94a-94e, 114a-114e, 130a-130e desired to operate simultaneously exceeds the flow capacity of the respective variable speed pump 14, 62, 82, 102, 122 (or a combination of the variable speed pump 14, 62, 82, 102, 122 and additional pumps) at a given system pressure, the flow produced by the pump 14, 62, 82, 102, 122 will not meet the components' 32a-32n, 74a-74e, 94a-94e, 114a-114e, 130a-130e flow demand. Typically, when component flow demand exceeds available pump flow, there is a system wide reduction of flow to all components, which can cause poor operation and non-functioning components and system inefficiencies. In the automatic system component underflow management mode of operation, if the system pressure cannot be maintained, or if the pre-programmed RPM value exceeds the capacity of the variable speed pump 14, 62, 82, 102, 122, the control system 22, 66, 86, 102, 122 will recognize an under pressure condition and will prioritize the components 32a-32n, 74a-74e, 94a-94e, 114a-114e, 130a-130e to assure proper component flow.

During prioritization, lower priority components will be paused and put on stand-by until higher priority functions and run cycles are complete. Accordingly, available flow capacity will be utilized to provide proper operation of the priority components. The control system 22, 66, 86, 102, 122 will prevent the lower priority component(s) from resuming operation until the prescribed or user defined duration of the higher priority component(s) is completed. For example, if the pool is being operated in high demand, and the user activates water features and spa jets during the normal time period of the in-floor cleaning operation, such that the pump cannot maintain system pressure, the control system 22, 66, 86, 102, 122 will recognize an underflow condition. Upon recognizing an underflow condition, the control system 22, 66, 86, 102, 122 will pause a lower priority or non-critical component, such as the in-floor cleaning system, to reduce the flow required so that the variable speed pump 14, 62, 82, 102, 122 can maintain proper system pressure and flow to the higher priority, user prescribed components, such as the water features and the spa jets. When those higher priority components are no longer being used, the control system 22, 66, 86, 102, 122 then resumes the in-floor system operation and completes the prescribed cleaning cycle(s) and duration. A priority level of each component can be set by the user, for example, during the initial setup procedure.

Additionally, the foregoing priority control operation can be implemented dynamically or statically. For example, during a dynamic implementation, if the control system 22, 66, 86, 102, 122 determines an underflow condition during operation, and the pump motor is operating at its maximum speed, then the control system 22, 66, 86, 102, 122 will pause operation of a lower priority or non-critical component. During a static implementation, the control system 22, 66, 86, 102, 122 will prevent additional components 32a-32n, 74a-74e, 94a-94e, 114a-114e, 130a-130e and control valves 30a-30n, 72a-72e, 92a-92e, 112a-112e, 128a-128e from being activated if activation of such would create an underflow condition. More specifically, the control system 22, 66, 86, 102, 122 determines the current cumulative flow requirements of the components 32a-32n, 74a-74e, 94a-94e, 114a-114e, 130a-130e presently operating, and will prevent additional control valves 30a-30n, 72a-72e, 92a-92e, 112a-112e, 128a-128e and components 32a-32n, 74a-74e, 94a-94e, 114a-114e, 130a-130e from being activated if activation of such control valve 30a-30n and component 32a-32n, 74a-74e, 94a-94e, 114a-114e, 130a-130e would cause the cumulative flow requirement to exceed the total pump flow capacity. Alternatively, in such a configuration, the control system 22, 66, 86, 102, 122 could allow the new control valve 30a-30n, 72a-72e, 92a-92e, 112a-112e, 128a-128e and component 32a-32n, 74a-74e, 94a-94e, 114a-114e, 130a-130e to be activated, but in turn deactivate a different control valve 30a-30n, 72a-72e, 92a-92e, 112a-112e, 128a-128e and component 32a-32n, 74a-74e, 94a-94e, 114a-114e, 130a-130e that has a lesser priority in order to allow the higher priority components 32a-32n, 74a-74e, 94a-94e, 114a-114e, 130a-130e to operate but not allow the cumulative flow requirement to exceed the total pump flow capacity.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure.

The invention claimed is:

1. A pumping and water distribution system for a pool or spa, comprising:
   a pump including a variable speed motor;
   a controller controlling the speed of the variable speed motor;
   a plurality of pool/spa components;
   a plumbing subsystem placing the plurality of pool/spa components in fluidic communication with the pump; and
   a plurality of control valves switchable between an open position and a closed position,
   wherein each of the plurality of control valves is associated with one of the plurality of pool/spa components, is positioned in the plumbing subsystem between the associated pool/spa component and the pump, and controls the flow of fluid to the associated pool/spa component,
   wherein each of the plurality of control valves is adjustable and calibratable such that each of the plurality of control valves is capable of providing different flow rates based on a set system pressure when in the open position,
   wherein the controller adjusts each of the plurality of control valves, and calibrates each of the plurality of control valves based on the set system pressure and a required flow rate of the associated pool/spa component such that each of the plurality of control valves provides a specific flow rate of fluid to the associated pool/spa component based on the set system pressure when in the open position, and
   wherein the controller adjusts the speed of the variable speed motor thereby adjusting a pressure of fluid within the plumbing subsystem to the set system pressure.

2. The pumping and water distribution system of claim 1, comprising a pressure sensor,
   wherein the pressure sensor senses the fluid pressure within the plumbing subsystem and provides a measurement of the sensed fluid pressure to the controller.

3. The pumping and water distribution system of claim 2, wherein the controller compares the fluid pressure measurement provided by the pressure sensor to the set system pressure, determines if the fluid pressure measurement is different than the set system pressure, and adjusts the speed of the variable speed motor if it is determined that the fluid pressure measurement is different than the set system pressure.

4. The pumping and water distribution system of claim 2, comprising a flow meter,
   wherein the flow meter senses the flow rate of the fluid within the plumbing subsystem and provides a measurement of the sensed fluid flow rate to the controller.

5. The pumping and water distribution system of claim 1, wherein the controller individually switches each of the plurality of control valves to an open position and determines a speed of the variable speed motor necessary to maintain the pressure of fluid within the plumbing subsystem equal to the set system pressure when each individual control valve is in an open position,
   and the controller adjusts the speed of the variable speed motor based on which control valves are in the open position.

6. The pumping and water distribution system of claim 5, wherein the controller groups the plurality of control valves into a plurality of groupings and for each grouping determines a speed of the variable speed motor necessary to maintain the pressure of fluid within the plumbing subsystem equal to the set system pressure when each control valve of the grouping is in an open position.

7. The pumping and water distribution system of claim 1, wherein each of the plurality of pool/spa components is assigned a priority value.

8. The pumping and water distribution system of claim 7, wherein the controller determines that a current total flow requirement for a plurality of activated pool/spa components exceeds a flow capacity of the pump and deactivates the pool/spa component having the lowest priority value.

9. The pumping and water distribution system of claim 1, wherein the controller adjusts the speed of the variable speed motor upon one or more of the plurality of the control valves being switched from an open position to a closed position or from a closed position to an open position.

10. The pumping and water distribution system of claim 1, comprising:
    a pressure sensor, wherein the pressure sensor senses the fluid pressure within the plumbing subsystem and provides a measurement of the sensed fluid pressure to the controller; and
    a flow meter, wherein the flow meter senses the flow rate of the fluid within the plumbing subsystem and provides a measurement of the sensed fluid flow rate to the controller,
    wherein the controller adjusts and calibrates each of the plurality of control valves based on the sensed fluid pressure, the sensed fluid flow rate, and a required flow rate of the pool/spa component associated with each respective control valve.

11. The pumping and water distribution system of claim 1, wherein the control valves are manually adjustable and calibratable by a field technician such that each of the control valves provides the specific flow rate of fluid to the associated pool/spa component based on the set system pressure when in the open position.

12. The pumping and water distribution system of claim 1, wherein the plurality of pool/spa components includes a pool/spa jet, an in-floor cleaning system, a water feature, a heater, a filter, a chlorinator, a chemical feeder, a sterilizer, or a pool cleaner.

13. The pumping and water distribution system of claim 1, wherein the pump includes a pump controller and the controller is remote from the pump controller, the controller communicating with the pump controller.

14. The pumping and water distribution system of claim 1, wherein each of the plurality of pool/spa components has a pressure requirement, and the set system pressure is based on the pool/spa component having the highest pressure requirement.

15. The pumping and water distribution system of claim 1, wherein each of the plurality of control valves are individually switchable between the open position and the closed position.

16. The pumping and water distribution system of claim 1, wherein one or more of the plurality of control valves are switchable as a group between the open position and the closed position.

17. A method for controlling a pool or spa pumping system, comprising:
receiving information at a controller, the information including a set system pressure and a required flow rate of each of a plurality of pool/spa components;
providing a plurality of control valves switchable between an open position and a closed position;
associating each of the plurality of control valves with one of the plurality of pool/spa components, and calibrating each of the plurality of control valves based on the information such that each of the plurality of control valves provides a specific flow rate of fluid to the associated pool/spa component based on the set system pressure when in the open position, each of the plurality of control valves being positioned in a plumbing subsystem between the associated pool/spa component and a pump and controlling the flow of fluid to the associated pool/spa component; and
adjusting the speed of a variable speed motor of the pump thereby adjusting a pressure of fluid within the plumbing subsystem to the set system pressure.

18. The method of claim 17, comprising:
switching one or more of the plurality of control valves from an open position to a closed position or from a closed position to an open position; and
adjusting the speed of the variable speed motor upon the switching of the one or more of the plurality of control valves.

19. The method of claim 17, comprising:
sensing a pressure of the fluid within the plumbing subsystem with a pressure sensor;
comparing the sensed pressure of the fluid to the set system pressure;
determining if the sensed pressure of the fluid is different than the set system pressure; and
adjusting the speed of the variable speed motor if it is determined that the sensed pressure of the fluid is different than the set system pressure.

20. The method of claim 17, comprising:
sensing a pressure of the fluid within the plumbing subsystem with a pressure sensor; and
sensing a flow rate of the fluid within the plumbing subsystem with a flow meter,
wherein the calibrating of each of the plurality of control valves is based on the information, the sensed pressure of the fluid within the plumbing subsystem, and the sensed flow rate of the fluid within the plumbing subsystem.

21. The method of claim 17, comprising:
switching each of the plurality of control valves to an open position;
determining a speed of the variable speed motor necessary to maintain the pressure of fluid within the plumbing subsystem equal to the set system pressure when each individual control valve is in an open position; and
adjusting the speed of the variable speed motor based on which control valves are in the open position.

22. The method of claim 17, comprising:
grouping the plurality of control valves into a plurality of groupings;
switching each of the plurality of control valves of one of the plurality of groupings to an open position;
determining a speed of the variable speed motor necessary to maintain the pressure of fluid within the plumbing subsystem equal to the set system pressure when each control valve of the grouping is in an open position; and
adjusting the speed of the variable speed motor based on which control valves are in the open position.

23. The method of claim 17, comprising:
assigning each of the plurality of pool/spa components a priority value; and
deactivating the pool/spa component having the lowest priority value upon determining that a total flow required for a plurality of activated pool/spa components exceeds a flow capacity of the pump.

24. A pumping and water distribution system for a pool or spa, comprising:
a pump including a variable speed motor;
a controller controlling the speed of the variable speed motor;
a plurality of pool/spa components;
a plumbing subsystem placing the plurality of pool/spa components in fluidic communication with the pump; and
a plurality of control valves switchable between an open position and a closed position,
wherein each of the plurality of control valves is associated with one of the plurality of pool/spa components, is positioned in the plumbing subsystem between the associated pool/spa component and the pump, and controls the flow of fluid to the associated pool/spa component,
wherein each of the plurality of control valves is calibrated based on a set system pressure and a required flow rate of the associated pool/spa component such that each of the plurality of control valves provides a specific flow rate of fluid to the associated pool/spa component when in the open position,
wherein the controller adjusts the speed of the variable speed motor thereby adjusting a pressure of fluid within the plumbing subsystem to the set system pressure, and wherein each of the plurality of pool/spa components is assigned a priority value and the controller determines that a current total flow requirement for a plurality of activated pool/spa components exceeds a flow capacity of the pump and deactivates the pool/spa component having the lowest priority value.

25. A method for controlling a pool or spa pumping system, comprising:

receiving information at a controller, the information including a set system pressure and a required flow rate of each of a plurality of pool/spa components;

providing a plurality of control valves switchable between an open position and a closed position;

associating each of the plurality of control valves with one of the plurality of pool/spa components based on the information such that each of the plurality of control valves provides a specific flow rate of fluid to the associated pool/spa component based on the set system pressure when in the open position, each of the plurality of control valves being positioned in a plumbing subsystem between the associated pool/spa component and a pump and controlling the flow of fluid to the associated pool/spa component;

adjusting the speed of a variable speed motor of the pump thereby adjusting a pressure of fluid within the plumbing subsystem to the set system pressure;

assigning each of the plurality of pools/spa components a priority value; and deactivating the pool/spa component having the lowest priority value upon determining that a total flow required for a plurality of activated pool/spa components exceeds a flow capacity of the pump.

* * * * *